July 10, 1923.
O. C. KNIGGE
DIRECTION INDICATOR
Filed Dec. 13, 1921
1,461,664
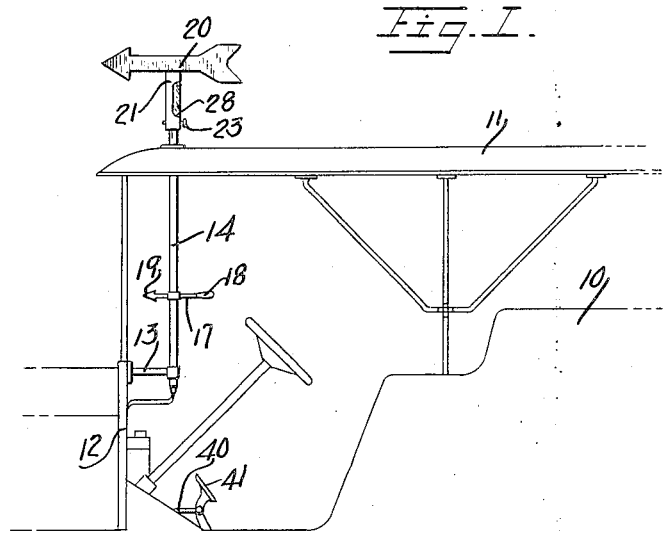
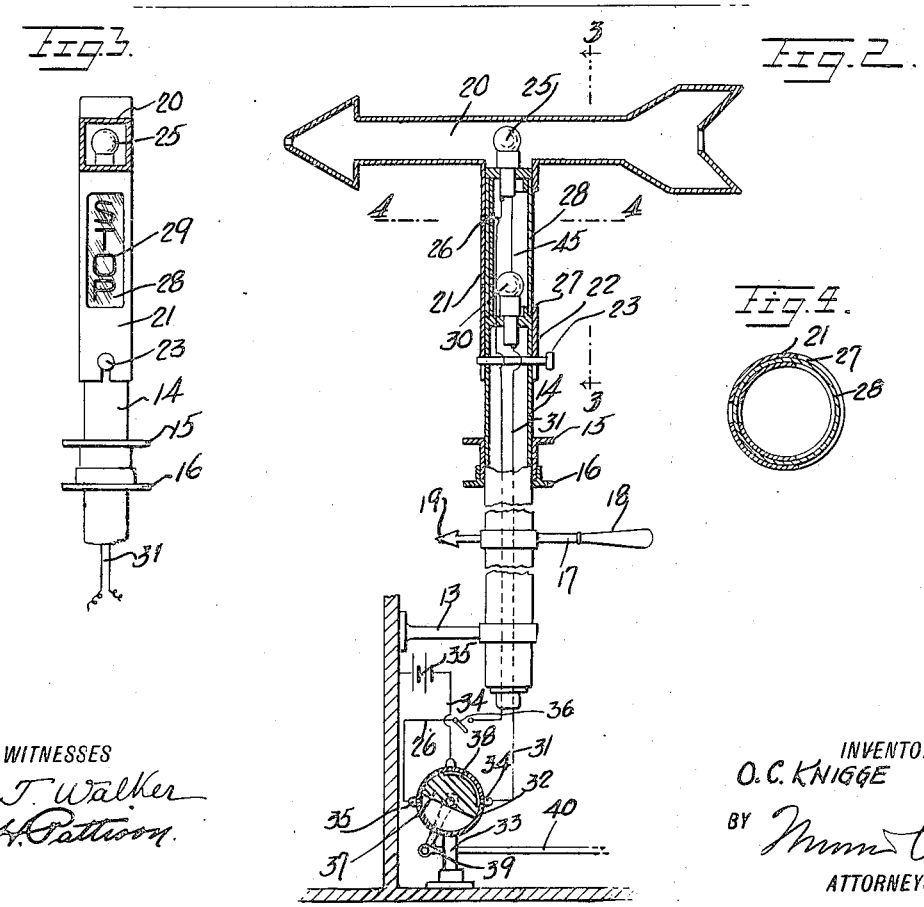
WITNESSES
H. J. Walker
P. H. Pattison
INVENTOR
O. C. KNIGGE
BY
ATTORNEYS Patented July 10, 1923.

1,461,664

UNITED STATES PATENT OFFICE.

OTTO CHARLES KNIGGE, OF NEW YORK, N. Y.

DIRECTION INDICATOR.

Application filed December 13, 1921. Serial No. 522,086.

*To all whom it may concern:*

Be it known that I, OTTO CHARLES KNIGGE, a citizen of the United States, and a resident of the city of New York, borough of Manhattan, in the county and State of New York, have invented a new and Improved Direction Indicator, of which the following is a full, clear, and exact description.

The present invention relates to new and useful improvements in signaling devices, and it pertains more particularly to a direction indicating device for motor vehicles.

It is one of the primary objects of the invention to provide means by which the contemplated direction of travel of a motor vehicle may be signaled to drivers of other vehicles, in order that collisions, delays in traffic, etc., may be reduced to a minimum.

It is a further object of the invention to provide a device of this character in which the signal may be given at a time before the actual operation of changing the direction of travel of a vehicle is performed.

A further object of the invention is to combine with a signal of this character, means for indicating the intention of the driver of a motor vehicle to stop the vehicle.

A further object of the invention is to so construct the stop signal that the same will be automatically operated upon the operation of the brakes of the vehicle.

It is a still further object of the invention to provide means by which the direction indicator may be illuminated to render it more clearly visible at night.

With the above and other objects in view, reference is had to the accompanying drawings, in which—

Figure 1 is a detail side elevation of a vehicle body equipped with a direction indicator constructed in accordance with the present invention;

Fig. 2 is a detail view broken away and partly in section of a direction indicator constructed and arranged in accordance with the present invention;

Fig. 3 is a sectional view taken on the line 3—3 of Fig. 2, and

Fig. 4 is a sectional view taken on the line 4—4 of Fig. 2.

Referring more particularly to the drawings, the reference character 10 designates the body of the vehicle, and 11 designates the top thereof. Secured to the dash 12 of the vehicle is a bracket 13, and rotatably mounted in said bracket and extending vertically therefrom, is a tubular standard 14. This tubular standard 14 is provided with opposed collars 15 and 16, which form a bearing for the tubular standard 14 at the point where it passes through the top 11, and said collars 15 and 16 serve to form a water-tight joint at this point. The tubular standard 14 is provided with an operating member 17, and said operating handle 17 is formed with a handle 18 and an arrow 19. Secured upon the upper end of the tubular standard 14 is an arrow or similar indicating member 20, and the position of the lower arrow 19 corresponds with the position of the indicating member 20 in order that the operator of the vehicle may by glancing at the arrow 19, tell the position of the upper indicating member 20.

The upper indicating member 20 is carried by a housing 21, and said housing 21 is in turn mounted upon the upper end of the standard 14, as more clearly shown in Fig. 2, the lower end of said housing 21 being of larger diameter than the upper end of the standard 14, as indicated at 22. The upper end of the standard 14 is adapted to be received telescopically in said enlarged lower end 22 of the housing 21. The reference character 23 designates a thumb screw or the like by means of which the housing 21 may be rigidly secured to the upper end of the standard 14. The upper indicating member 20 is formed of any suitable transparent material and mounted therein is a light 25, to which current is supplied by means of a conductor wire 26. The housing 21 is cut out as indicated by the reference character 27, and mounted in said cut-out portion is a plate 28, preferably of transparent colored material. This plate bears the legend " Stop " as shown at 29 in Fig. 3. Mounted within the housing 23, is a lamp 30, and current is supplied to the lamp by means of a conductor wire 31.

Suitably secured to the floor or other suitable point of the vehicle, is a controlling switch, and said controlling switch comprises a housing 32 carried by a standard 33 or the like. Leading into the housing 32 near the upper end thereof is a wire 34, which in turn is connected to a battery or other suitable source of supply 35. The wire 31 leading from the lamp 30 extends into one side of the housing 32, as at 34, and the wire 26 leading from the lamp 25 leads into the opposite side of the housing, as shown at 35. In this last-mentioned wire 26, a manually operated switch 36 is employed for a purpose to be hereinafter described.

Mounted within the housing 32 of the switch, is a rotor 37, and said rotor is provided with a circular contact plate 38. This rotor is operated by means of a lever 39 connected by means of a link 40 to the brake lever 41 in such a manner that as the brake lever is operated through the medium of the link 40, the lever 39 will be operated to rock the rotor 37 to the position shown in Fig. 2, in which position the plate 38 serves to connect the wire 34 with the wire 31 to supply current to the lamp 30. With the parts in this position, both the lamps 25 and 30 will be illuminated since they are connected by means of a wire 45 as shown, and the current passes from the lamp 30 to the lamp 25 by means of the wire 45. As the brake lever is released and the brake moves to the position shown in Fig. 1, through the medium of the link 40, the lever will be rocked to the right in Fig. 2 sufficiently to move the rotor to a position where the plate 38 will establish connection between the wire 34 and the wire 26. With the parts in this position, the lamp 25 only will be operated.

The device operates in the following manner:

Assuming that a vehicle is traveling straight ahead and the operator wishes to turn to the right, he grasps the handle 18 and through the medium thereof rotates the vertical standard 14 until the indicating member 20 points to the right. This operation is carried out before the vehicle reaches the point at which the turn is to be made, and upon reaching said point, the operator turns the vehicle in the direction indicated. Immediately the turn has been completed, the operator grasps the handle and moves the indicator to the straight ahead position.

Assuming now that the operator is driving the vehicle straight ahead and desires to stop, immediately upon the application of the brakes by a depression of the foot lever 41, connection is established, as heretofore described, between the battery 35 and the lamp 30, which lamp lights behind the plate 28 and illuminates the legend "Stop" thereon in order that operators of vehicles approaching from the rear may be apprised of the fact that the operator of the preceding vehicle has applied the brakes thereof with the intention of bringing the vehicle to a stop.

The lamp 25 serves to illuminate the indicating member 20 at night, and in the daytime the switch 36 is operated in order that this lamp may be cut out of circuit since its use is unnecessary.

From the foregoing it is apparent that the present invention provides a new and improved direction indicator in which the contemplated direction of travel may be signalled to operators of vehicles in the vicinity, and that, furthermore, in connection with the direction indicator, a stop signal is provided which is automatically operated upon application of the brakes of the vehicle to which it is attached.

I claim:

1. A direction indicator for vehicles comprising a bracket carried by the dash of the vehicle, a standard mounted in said bracket and projecting through the top of the vehicle, said standard having a reduced portion on its upper end forming a base for a lamp housing, a direction indicator, and a tubular extension projecting from said direction indicator, said tubular extension being of a diameter to permit of its passing over the upper end of said standard to complete the lamp housing and form a mount for said direction indicator on said standard.

2. A direction indicator for motor vehicles comprising a bracket carried by the vehicle, a standard rotatably mounted in said bracket and projecting through the top of the vehicle, said standard having a reduced upper end forming a base for a lamp housing and a partition for supporting a lamp within said housing, and a direction indicator, said direction indicator having a depending tubular member adapted to receive the reduced extension of said standard to complete the lamp housing and form a mount for the direction indicator, means for securing the direction indicator to said standard, and means for rotating said standard to cause a movement of the direction indicator.

3. A direction indicator for motor vehicles comprising a bracket, a vertically extending standard mounted in said bracket and projecting through the top of the vehicle, a reduced portion formed on the upper end of said standard and providing a base for a lamp housing, a direction indicating element, a tubular extension adapted to receive the reduced portion of said standard to form a mount for the direction indicating element and complete the lamp housing, and a window formed in said tubular extension, said window being of a length substantially equal to the length of the lamp housing formed in the standard.

4. A direction indicator comprising a bracket, a standard projecting vertically therefrom, said standard having a reduced upper end forming a base for a lamp housing having a legend displaying wall, a direction indicating element carried by the upper end of said standard and having a depending tubular portion adapted to receive the upper end of said standard and complete the lamp housing, means for interlockingly engaging the depending tubular portion with the upper end of said standard, and a window provided in the depending tubular member of the direction indicating element, said element being so formed as to expose the legend-displaying wall of the lamp housing.

OTTO CHARLES KNIGGE.